United States Patent Office 3,017,274
Patented Jan. 16, 1962

3,017,274
PROCESS OF MANUFACTURING DAIRY PRODUCTS
Allan T. Dahlstrom, Castro Valley, Calif., assignor to Safeway Stores, Incorporated, Oakland, Calif., a corporation of Maryland
Filed Dec. 31, 1959, Ser. No. 863,159
18 Claims. (Cl. 99—116)

This invention relates generally to the manufacture of dairy products, and more particularly to milk-souring or fermentation processing adapted to produce products such as buttermilk and cottage cheese.

In conventional processing, a culture of milk-souring or "lactic acid" bacteria is employed to propagate the fermentation reaction. Generally, a mother culture is maintained, and a bulk "starter" prepared from day to day from the mother culture. The usual procedure is to select and pasteurize a quantity of skim milk needed for the starter, and to inoculate this milk with the mother culture. At 70° F., about one percent of the mother culture will produce a firm, fully coagulated starter in approximately 15 hours.

In the manufacture of cottage cheese, the first step is to add the starter to the milk (usually fresh, pasteurized skim) along with any additional ingredients such as color or rennet. The proportion of starter is customarily between 0.5 to 5.0% of the weight of the skim milk, depending upon the activity of the starter, the acidity of the skim milk and the temperature conditions employed for coagulation or "setting" of the curd. In the "quick set" process (85 to 90° F.) coagulation to a firm curd is obtained in about four to six hours. Thereafter the curd is cut and cooked, separated from the whey, washed and salted for packaging.

From the above, it will be apparent that considerable time is required for bacterial fermentation, in preparing the starter and in coagulating the curd. The resultant tie-up for equipment (about 20 hours in the case of cottage cheese) is a matter of major concern to dairy producers. Of particular concern is the hindrance to efficient plant scheduling of equipment and utilization of personnel for the most productive use of labor.

In general, it is an object of the present invention to provide a novel method for the manufacture of buttermilk, cottage cheese and other fermented dairy products by which a substantial reduction in the time required for bacterial fermentation is made possible (frequently amounting to as much as half the time normally required).

Another object of the invention is to provide a method of the above character employing a non-coagulated bulk starter of relatively low acidity, compared to conventional coagulated starters.

Another object of the invention is to provide the dairy industry with a continuous fermentation method by which greatly simplified scheduling of personnel and a more efficient use of equipment is made available.

A further object of the invention is to provide such a method which actually results in improved yields and a more acceptable product quality.

Other objects and advantages of the present invention will appear from the following description and from the drawing in which.

It is generally accepted that inoculation with coagulated, fully ripened plant cultures, having titratable acidities of between 0.75 and 0.95% (calculated as lactic acid) is essential to the production of unripened cheese (e.g., cottage cheese), butter milk, and similar products. I have found, however, that equivalent or better results can be obtained through use of non-coagulated cultures developed to a relatively low acidity of 0.45% or less. Specifically, in the preparation of bulk starters, I have found that two to three times the volume of the low acid non-coagulated cultures will more than equal the activity of the conventional higher acid cultures, and will reduce the time required for starter preparation by almost half. Carrying this concept into cheese and buttermilk manufacture, I have found that a plant starter ranging in acidity from 0.25 to 0.45% will likewise reduce the time to coagulate or "set-up" the curd in substantial proportion to the amount of low acid starter employed. Best results require the use of at least 10% of such low acid starter (based on the weight of the milk) and preferably amounts ranging to 50% or more. Finally, I have found that the use of low non-coagulating acidities makes possible a continuous step in fermentation processing—wherein a removed portion of the culture is replaced with fresh milk—that is not possible or known to those accustomed to the use of coagulated, high acid cultures.

Figure 1:
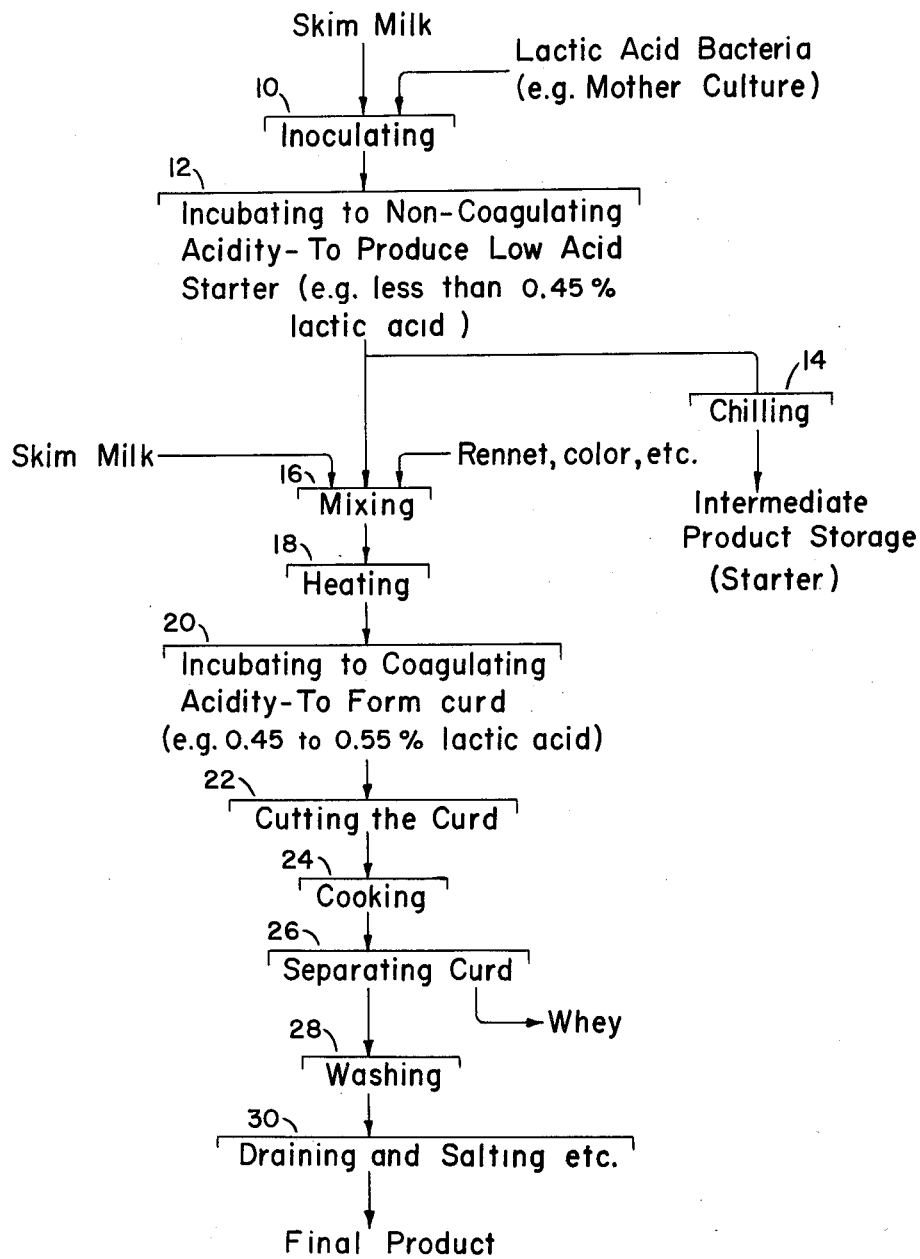
FIGURE 1 is a flow sheet illustrating the general steps in carrying out my method.

While it is possible to employ the concepts of the present invention in connection with any dairy process employing a culture inoculation (e.g. of milk, skim milk, or reconstituted milk or skim milk), it is particularly described in connection wth the manufacture of cottage cheese from skim milk. Assuming such manufacture, the method can be carried out substantially as illustrated in FIGURE 1. Step 10 represents the inoculation of a quantity of skim milk with the mother culture of lactic acid bacteria. Inoculation can be with either a high or a low acid culture. When a low acid culture is employed, it should be added in amounts approximately two to three times that conventionally employed with a high acid culture (e.g. 2 to 3% on the weight of the milk). Step 12 illustrates incubation of the inoculated milk at constant temperature (70° F.) to obtain the low acid starter. Incubation of about six to nine hours is generally sufficient to obtain a desired non-coagulating acidity between about 0.25 and 0.45%. This compares with fifteen or sixteen hours normally required to produce a high acid starter (e.g., 0.75 to 95%). The resulting low acid starter can be used as is, or preserved for future use by cooling as indicated in step 14. For this latter purpose, chilling to a temperature well below 50° F. is essential, although cooling to below 60° F. will substantially arrest the activity of the starter for a relatively short period of storage.

In step 16, the low acid starter is added to a supply of fresh pasteurized skim milk in a cheese vat or other suitable container. The proportion of starter added is preferably between about 10 to 50% of the weight of the milk being treated although greater proportions can be satisfactorily employed if desired. Agents to induce setting (e.g. rennet), color and other desired ingredients may also be added at this time. The dispersed ingredients can now be heated in step 18 to induce a more rapid curd formation. Heating to a temperature of 85 to 90° F. is conventionally employed in the so-called "quick set" procedure. If desired, the ingredients may be separately heated before mixing in the step 16. In step 20 time is allowed for incubation to achieve a coagulating acidity, preferably of the order of 0.48% (acidity of clear whey) to obtain setting of the curd. The precise acidity of the coagulated product will depend on whether a rennet curd or an acid curd (without rennet) is obtained, with acidities generally ranging from about 0.45 to 0.55% (acidity of whey).

As indicated, the time required for setting or coagulation in step 20 depends to a large extent on the temperature of incubation (85 to 90° F. being preferred). I have additionally found that use of the low acid starter in amounts greater than about 10% has a supplementary effect of reducing the set-up time almost in direct relation to the amount of low acid starter employed. This relation is illustrated in the following table which compares the set-up times obtained with a low acid starter (0.45%) with the five hour period normally experienced with conventional high acid starters:

| Percent Addition Low Acid Starter | Set-up Time, Hours @ 85-90° F. | Reduction in Set-up Time | |
|---|---|---|---|
| | | Percent | Hours |
| 10 | 5 | | |
| 25 | 4 | 20 | 1 |
| 50 | 2½ | 50 | 2½ |
| 100 | 1 | 80 | 4 |

The curd produced in step 20 can now be processed in conventional fashion to produce cottage cheese. This includes cutting the curd in step 22, for example, with cheese knives, to obtain different uniform sizes as required for various markets. The curd is now heated or cooked in step 24, typically by a steam jacket surrounding the cheese vat. After the whey has been drawn or separated from the curd in step 26, the curd is washed, drained and salted to produce the final product.

Figure 2:
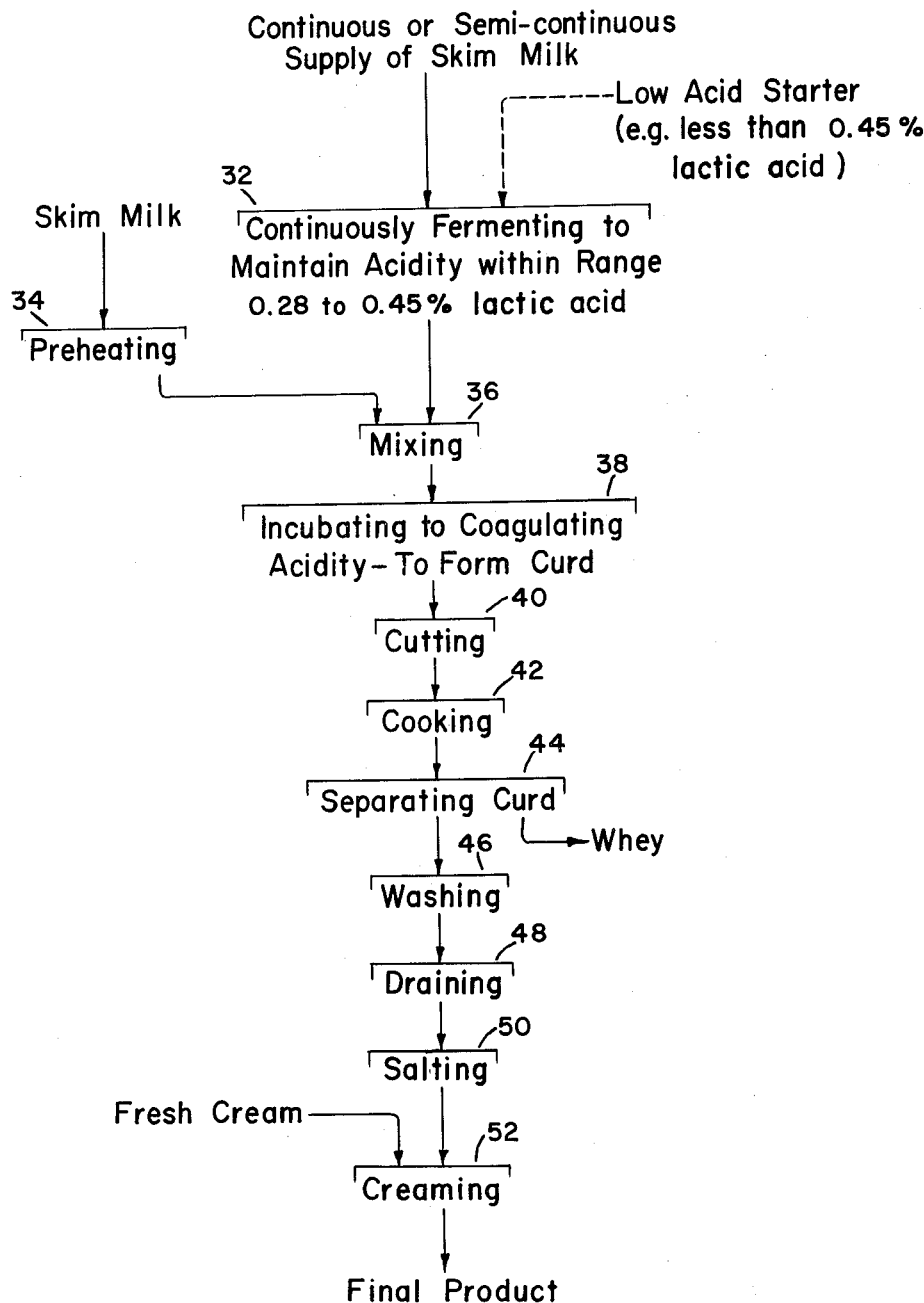
FIGURE 2 is a flow sheet illustrating a modified version of the method, employing a continuous fermentation step.

The processing so far described has been related to the production of separate batches or amounts of the bulk starter as is customary in the trade. However, as illustrated in FIGURE 2, the starter in non-coagulated low acid form can be continuously used and replaced by fresh skim milk in a continuous fermentation process. As particularly represented in step 32, skim milk can be continuously added to a freshly prepared quantity of low acid starter, with portions of the starter being simultaneously removed for use in the cheese vats. Such processing assumes an addition of fresh skim and withdrawal of starter at a predetermined proportional rate to maintain the acidity of the mixture of added milk and starter at a preferred non-coagulating acidity between about 0.25 and 0.45%. Subsequent processing can be substantially as before or, if desired, the skim milk can be preheated to 85 to 90° F. in step 34 and mixed with a quantity of the removed starter in the step 36. Coagulation and setting of the curd in step 38 and the processing of steps 40 through 50 can proceed in conventional manner. Step 52 illustrates the customary creaming of the curd to produce an alternate product (e.g. creamed cottage cheese).

Figure 3:
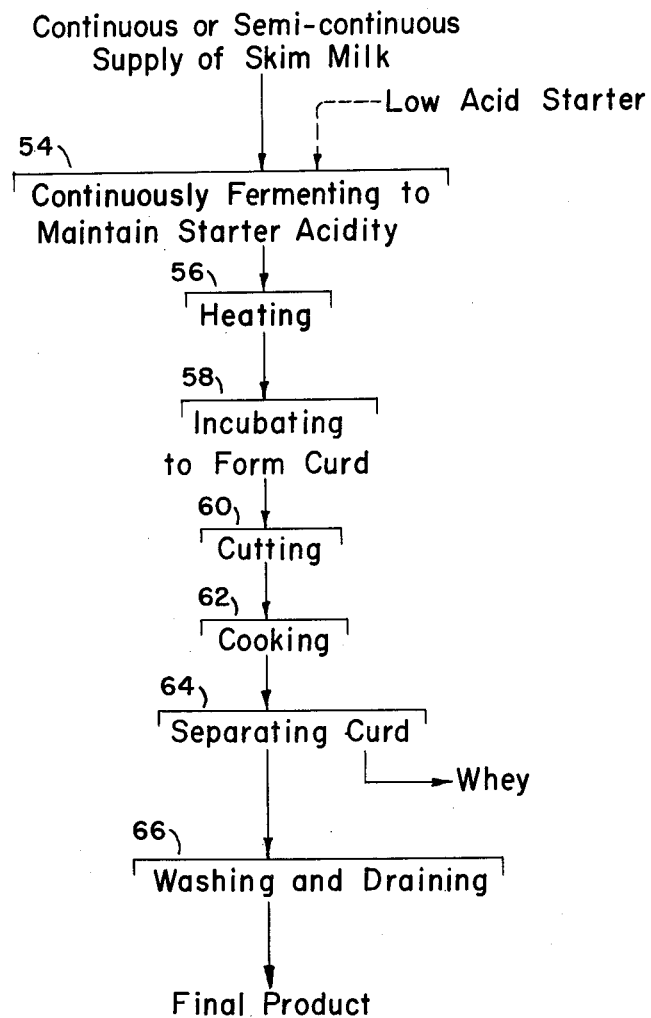
FIGURE 3 is a flow sheet illustrating a further modification of my method.

FIGURE 3 illustrates a further modification of the invention arising out of the concept of continuous production of low acid starter, as represented in step 54. According to this process, low acid starter removed from the processing is heated in step 56 and pumped directly to the cheese vats without mixing with additional skim milk. The setting, cutting, cooking and other processing of the curd to the final cottage cheese product is obtained, as previously described, in the steps 58 through 66.

The processing in accordance with the invention has many advantages. Specifically, it permits the preparation of bulk starters for plant use in approximately half the time heretofore required. Moreover, the starter so produced, being in non-coagulated form, is readily adapted to a continuous processing step which greatly increases operating efficiency and which requires but one initial inoculation with the mother culture. This processing, exemplified in FIGURES 2 and 3, is not possible with a coagulated culture. Also, the non-coagulated cultures upon setting become a part of the final product, and are not lost during the whey separation as would be the case with equivalent proportions of a coagulated culture. When combined with the very substantial reduction in processing times, these factors insure greatly increased flexibility of operation and production efficiencies.

Perhaps of even greater importance is the fact that low acid cultures seem to produce smoother buttermilk, and more acceptable curds in cottage cheese, than do the coagulated, higher acid cultures. Increased yields, better whey separation and improved flavor are also obtained. While the precise reason for this improvement in product quality is not fully understood, it is believed to result from the reduced incubation times at the higher temperatures made possible by the shorter setting times in the cheese vats. There is also less opportunity for air contamination both during starter preparation and setting, providing improved keeping qualities of the final products.

The many advantages of the invention are exemplified in the following specific examples of its practice:

*Example 1*

A low acid bulk starter was prepared by inoculating a quantity of fresh pasteurized skim milk in conventional fashion with a laboratory culture (0.90% lactic acid) and allowing the same to incubate at 74° F. for about nine hours. This produced a starter having an acidity of 0.42%.

To 19,500 pounds of fresh pasteurized skim milk (16 seconds at 163° F.) at 93° F. and having an acidity of 0.15%, were added 1400 pounds of the above starter at 45° F. 20 milliliters of rennet were also added. The resulting mixture, at a temperature of 82° F. and an initial acidity of 0.17%, was allowed to incubate in a cheese vat until the titratable acidity of the whey reached 0.50%. The elapsed time to setting of the curd was 5 hours and 35 minutes.

*Example 2*

A low acid starter was prepared substantially as in Example 1 and incubated at 70° F. to achieve an acidity of 0.40% lactic acid. To 410 gallons of fresh pasteurized skim milk at 97° F. and 0.15% acidity were added 200 gallons of this starter. 6 milliliters of rennet were also added. The resulting mixture was incubated at a final temperature of 88° F. to a coagulating acidity of 0.46% (whey acid). The elapsed time to set was 2 hours and 50 minutes.

*Example 3*

Following substantially the procedures of Examples 1 and 2, a low acid starter was prepared by adding 50 gallons of a laboratory culture (0.63% lactic acid) to 550 gallons of pasteurized skim milk, and the resulting mixture incubated at 68° F. for 6½ hours. The acidity of the starter at this point was 0.28%. The starter was then cooled to 50° F. to prevent further bacterial activity.

Within 24 hours, 175 gallons of this starter were withdrawn, heated to room temperature (68° F.), and added to 425 gallons of fresh pasteurized skim milk at 98° F. and 0.15% acidity. 4 milliliters of rennet were added and the resulting mixture incubated at 89° F. until a whey acidity of 0.48% was obtained, as evidenced by setting of the curd. Elapsed time to setting was 4 hours.

*Example 4*

To a 5000 gallon starter tank were added 100 gallons of a laboratory culture (0.90%) and 4800 gallons of fresh pasteurized skim milk (16 seconds at 163° F.). The mixture was incubated at 74° F. for 7½ hours to achieve a non-coagulating acidity of 0.35% calculated as lactic acid.

Following incubation of the low acid starter, fresh skim milk was continuously added to the tank at a rate of 800 gallons an hour. Simultaneously, irregular amounts of starter were withdrawn from the tank and pumped through a heat exchanger to processing in 15 cheese vats. The separate withdrawals were made in amounts averaging about 740 gallons over a period of 12½ hours. During this period, a total of 11,100 gallons of starter were withdrawn from the tank, while 10,000 gallons of fresh skim milk were added to the tank. The acidity within the tank ranged from a low of 0.28% to a high of 0.38%, the latter being the acidity at the end of the period.

Each portion of removed starter was preheated to 90° F. and added to a proportional amount of skim milk (preheated to 93° F.) in a cheese vat. A total of 11,900 gallons of fresh skim milk was received for use in the 15 vats. Each of the vats was set to a coagulating whey acidity of 0.48%; the set-up times in the various vats ranging from a low of 2 hours and 45 minutes to a high of 3 hours and 35 minutes.

The curd in each of the vats, after setting, was cut, cooked, drained of whey, washed and salted to produce a final cottage cheese product. All of the products were of excellent quality, and most exhibited an improved flavor. Whey separation in the vats was superior to that normally experienced, and increased yields were observed, amounting to 2 to 4% for the 15 vats.

*Example 5*

Following substantially the procedure of Example 4, 100 gallons of laboratory culture (0.90% acidity) were added to 4400 gallons of pasteurized skim milk and incubated at 74° F. for 7 hours to achieve a non-coagulating acidity of 0.31%.

During the next 6 hours, 2000 gallons per hour of fresh pasteurized skim milk were added to the tank simultaneously with withdrawal of about 17,300 gallons of starter to 11 cheese vats. Each withdrawal averaged approximately 1575 gallons and was preheated on the way to the cheese vat to a temperature of 90° F. At the cheese vats, the removed starter was processed directly to cottage cheese without any mixing with skim milk. The set-up time in the various vats ranged from a low of 1 hour and 55 minutes to a high of 2 hours and 50 minutes. The acidity in the starter tank ranged from a low of 0.31% to a high of 0.39%. The temperature of the starter tank was maintained at approximately 74° F. throughout the 6 hour period.

Cheese processed in this manner was of excellent quality, and upon cutting, cooking and otherwise processing to cottage cheese, provided improved flavor, better whey separation and an increased yield, computed at approximately 2 to 4% above normally experienced yields.

I claim:

1. In a process for the manufacture of unripened cheese, the steps of dispersing in the milk a non-coagulated starter having an acidity calculated as lactic acid no greater than about 0.45%, and incubating the milk and starter for a period of time sufficient to achieve a coagulating acidity in excess of 0.45%.

2. In a process for the manufacture of unripened cheese, the steps of dispersing in the milk a non-coagulated starter having an acidity calculated as lactic acid no greater than about 0.45%, said starter being added to the milk in a proportion in excess of 10% by weight of said milk, and incubating the milk and starter for a period of time sufficient to achieve a coagulating acidity in excess of 0.45%.

3. In a process for the manufacture of unripened cheese, the steps of dispersing in the milk a non-coagulated starter having an acidity calculated as lactic acid between about 0.25 and 0.45%, elevating the temperature of said intermixed milk and starter to between 80 and 95° F., and holding the mixture at such elevated temperature for a sufficient period of time to achieve a coagulating acidity in excess of 0.45%.

4. In a process for the manufacture of unripened cheese, the steps of dispersing in the skim milk a non-coagulated starter having an acidity calculated as lactic acid between about 0.25 and 0.45%, said starter being added in a proportion in excess of about 10% by weight of the milk, elevating the temperature of said intermixed milk and starter to between 80 and 95° F., and holding the mixture at such elevated temperature for a sufficient period of time to achieve a coagulating acidity in excess of 0.45%.

5. In a process of producing cottage cheese, the steps of preparing a low acid starter by inoculating skim milk with a culture of lactic acid bacteria and allowing the same to incubate until a non-coagulating acidity of between 0.25 and 0.45% is obtained, dispersing said low acid starter in fresh skim milk in a proportion in excess of about 10% by weight of said milk, elevating the temperature of said intermixed milk and starter to between 80 and 95° F., holding the mixture at this elevated temperature for a sufficient period of time to achieve a coagulating whey acidity of the order of 0.48%, and thereafter cutting, cooking and washing the coagulated curd and separating the whey as in conventional cottage cheese manufacture.

6. In a continuous process of controlled fermentation employing a lactic acid starter, the steps of inoculating fresh skim milk with a culture of lactic acid bacteria, allowing the same to incubate until a non-coagulating acidity of less than about 0.45% is obtained, thereafter continuously adding to the low acid starter thus formed additional fresh skim milk, and continuously withdrawing low acid starter in amounts equivalent to the continuous addition of fresh milk, the addition of fresh milk and the removal of the starter being at a rate whereby the acidity of the mixture of milk and starter is maintained between about 0.25 and 0.45%.

7. A process as in claim 6 wherein the removed starter is added to fresh skim milk, and the resulting mixture incubated for a sufficient period of time to achieve a coagulating acidity of the order of about 0.48%.

8. A process as in claim 6 wherein the removed starter is heated to a temperature between 80 and 95° F. and held at that temperature for a sufficient period of time to achieve a coagulating whey acidity of the order of 0.48%.

9. In a continuous process for the controlled fermentation of milk, the steps of preparing a low acid starter by inoculating an initial quantity of milk with a culture of lactic acid bacteria and allowing the same to incubate, until a non-coagulating acidity of less than 0.45% is achieved, continuously adding additional milk to the resulting low acid starter and removing a portion of said starter at a rate to maintain the acidity between about 0.25 and 0.45%, dispersing the removed portion of the starter in milk to be processed.

10. In a continuous process of producing cottage cheese, the steps of preparing a low acid starter by inoculating an initial quantity of milk with a culture of lactic acid bacteria and allowing the same to incubate until a non-coagulating acidity of less than 0.45% is achieved, continuously adding additional milk to the resulting low acid starter and removing a portion of said starter at a rate to maintain the acidity between about 0.25 and 0.45%, dispersing the removed portion of the starter in milk to be processed in a proportion in excess of about 10% by weight of said milk, elevating the temperature of the resulting mixture of starter and milk to between 80 and 95° F. and maintaining the mixture at this temperature for a sufficient period of time to achieve a coagulating acidity in excess of 0.45%.

11. In a continuous process for the controlled fermentation of skim milk, the steps of inoculating a quantity of skim milk with a culture of lactic acid bacteria having a non-coagulating acidity of less than 0.45%, incubating the same to produce a low acid starter having a non-coagulating acidity between about 0.25 and 0.45%, continuously removing a portion of the starter thus formed, simultaneously adding fresh skim milk to the remainder of the starter in a proportion equivalent to the amount removed, the rate of removal of starter and addition of fresh milk being such that continuous fermentation occurring within the starter maintains its acidity within the range of from about 0.25 to 0.45%.

12. A process as in claim 11 wherein said removed portions of the starter are heated to a temperature of the order of 90° F. and then incubated to achieve a coagulating acidity in excess of 0.45%.

13. In a continuous process of producing cottage cheese, the steps of inoculating a quantity of skim milk with a quantity of lactic acid bacteria, incubating the same to produce a low acid starter having a non-coagulating acidity between about 0.25 and 0.45%, continuously removing a portion of the low acid starter thus formed, simultaneously adding fresh skim milk to the remainder of the starter in proportions equivalent to the amount removed, dispersing the removed starter in fresh skim milk, the rate of removal of starter and addition of fresh milk being such that continuous fermentation occurring within the starter maintains its acidity within the range of from about 0.25 to 0.45%, incubating the removed starter and milk to achieve a coagulating whey acidity of the order of 0.48% whereby the mixture is caused to set in the form of a curd, thereafter subjecting the curd to cutting, cooking and washing and to processing to separate the whey as in conventional cottage cheese manufacture.

14. A process as in claim 13 wherein the skim milk used in forming the curd is preheated to a temperature of the order of 90° F. prior to the addition of the removed starter.

15. A process as in claim 14 wherein an agent to induce setting of the curd is added to the mixture of milk and removed starter prior to incubation.

16. A process as in claim 15 wherein said agent is rennet.

17. In a process for the controlled fermentation of milk in the manufacture of unripened cheese, the steps of preparing a low acid starter by inoculating a portion of skim milk with a culture of lactic acid bacteria and allowing said portion to incubate for a period of six to nine hours, until a non-coagulating acidity of between 0.25 and 0.45% is obtained.

18. In a process for the manufacture of unripened cheese, the steps of dispersing in a portion of milk a non-coagulated starter having an acidity calculated as lactic acid no greater than about 0.45%, and incubating said portion of milk and starter for a period of less than five hours to achieve a coagulating acidity in excess of 0.45%.

References Cited in the file of this patent

Storrs Agricultural Experiment Station, Storrs, Conn., Bulletin No. 58, June 1909, p. 335.

United States Department of Agriculture, Miscellaneous Publication No. 119, issued October 1931, revised February 1934, Washington, D.C., pp. 1–7.